Oct. 9, 1934.   K. J. KINNICUTT   1,976,616
TRAY INSERT FOR COOKING UTENSILS
Filed Aug. 31, 1933
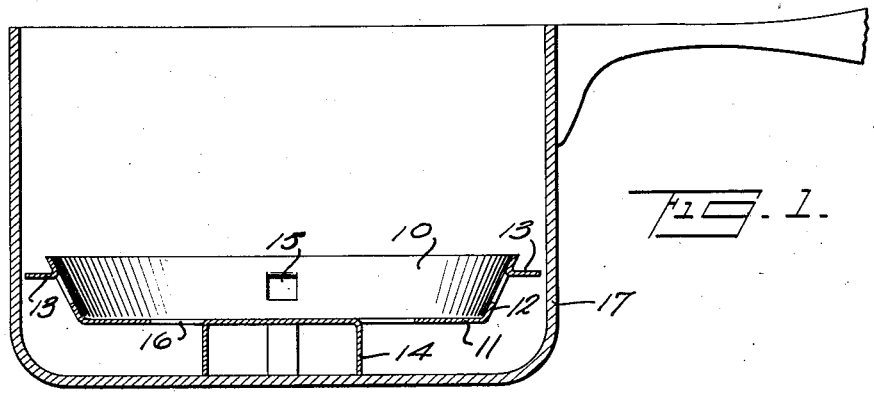
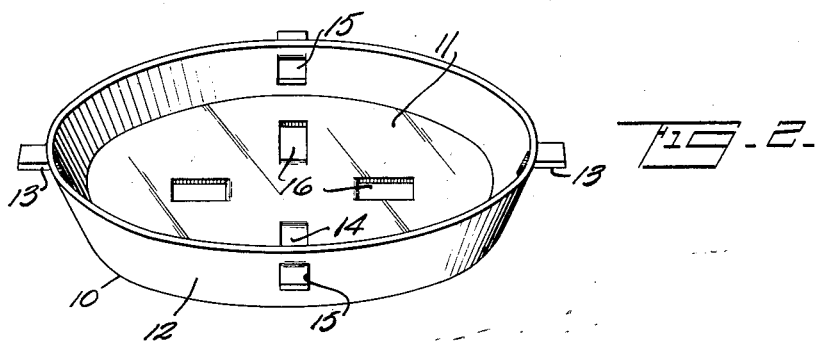
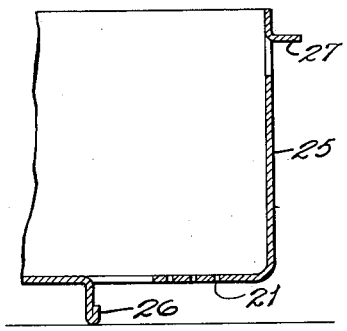
INVENTOR
Katherine J. Kinnicutt
BY
Edwin H. Owen
ATTORNEY Patented Oct. 9, 1934

UNITED STATES PATENT OFFICE 1,976,616

TRAY INSERT FOR COOKING UTENSILS

Katherine J. Kinnicutt, Island Park, N. Y.

Application August 31, 1933, Serial No. 687,549

1 Claim. (Cl. 53—1)

This invention relates to means for protecting food from burning when water boils away in cooking utensils and more particularly to a receptacle which is adapted to be placed within a cooking utensil and is arranged to prevent any food articles contained therein, from coming into direct contact with the side wall or bottom of the cooking utensil while the food is being cooked.

A common failure among cooks is to have food articles burn when the water in the utensil containing same boils away, due to the direct contact with the walls or bottom of the utensil. Most foods are immediately spoiled when burned or even slightly scorched.

According to the present invention a tray has been provided which is adapted to be placed within a cooking utensil and is supported in a spaced relation to both the bottom and side wall of same and is provided with its own side wall. Any food therefor which is contained within said tray will not come into contact with the side or bottom of the cooking utensil. Water contained in the cooking utensil is permitted to circulate freely through and around the food articles within the tray, while in the process of cooking, in the usual manner but if the cooking utensil should happen to be left unattended for some time and the water should boil away, the food would remain protected for a certain period before it would become unfit to eat.

Certain attempts have been made to accomplish the above result by means of a plate like member which is placed on the bottom of the cooking utensil but there is no protection offered for the food thereon since the plate will only support food articles thereon in a spaced relation to the bottom of the cooking utensil but not in a spaced relation to the side walls thereof. Thus said food articles will contact the said side walls and when the boiling water recedes below their point of contact with the walls of the container the food will become scorched. Such plates are also limited for use with certain of the bulkier foods such as potatoes and the like, while the tray formation of this invention with a side wall thereon is adapted to be used with any form of food, from the mushy type such as apple sauce, to the bulky foods.

It is therefore one object of this invention to provide a tray to be inserted inside of a cooking utensil, which will be adapted to hold food within its own wall and which is provided with means to maintain same in a spaced relation to both the side wall and the bottom of said container.

With the foregoing and other objects in view, which will appear in the following description, the invention resides in the combination and arrangement of parts which will be fully described in connection with the accompanying drawing and the novel features pointed out in the claim hereunto annexed.

In the drawing:

Fig. 1 is a view showing a vertical section through a cooking utensil and a tray member contained therein;

Fig. 2 is a perspective view of the tray shown in Fig. 1;

Fig. 3 is a sectional detail of a deep tray having high side walls, and

Referring to Figs. 1 and 2, the tray indicated therein comprises a dished member 10 having a bottom 11 and a side wall 12. Means to maintain said tray in spaced relation to a side wall and bottom of a cooking utensil may be provided in any desired manner such as for example by lugs 13 which are pierced and bent outward from the side wall 12 and feet 14 which are pierced and bent downward from the bottom 11 of the tray. This provides a very inexpensive form of structure. Openings 15 and 16, which result from the piercing and forming of the lugs and feet, will provide passages for the circulation of water contained in the cooking utensil 17. Other openings may be provided if desired.

When assembled within the cooking utensil 17, as shown in Fig. 1, it will be observed that the tray is supported in spaced relation to the floor and wall by means of the feet 14 and the lugs 13 respectively. Any transfer of heat by conduction from the cooking utensil to the tray is therefore practically eliminated.

A deep walled tray is shown at 25, Fig. 3 which will be used when large quantities of food are to be cooked and is provided with feet 26 and side wall lugs 27 to hold same in spaced relation to the side wall of the cooking utensil. Perforations may also be provided as indicated at 21, Fig. 3, if desired.

While preferred forms of structure have been shown and described, changes may be made in the details set forth without departure from the essentials of the invention as defined in the following claim:

I claim:

In an insert for cooking utensils, a perforated container having a bottom portion, a side wall extending upwardly therefrom, lugs punched from the side wall of the tray and extending sidewardly therefrom, and lugs punched from the bottom of said tray and extending downwardly therefrom, whereby said tray is adapted to be maintained in a spaced relation to the sides and bottom of the inside of the cooking utensil.

KATHERINE J. KINNICUTT.